United States Patent [19]

Prochazka et al.

[11] 4,124,544
[45] Nov. 7, 1978

[54] METHOD OF PRODUCING AN ACTIVATED CATION-RETAINING SORBENT THROUGH FORMATION OF A MICROCRYSTALLINE PRECIPITATE WHICH ADHERES IN THE PORES AND ON THE SURFACE OF THE SORBENT

[75] Inventors: Hubert Prochazka, Brno; Karel Stamberg, Prague; Rudolf Jilek, Brno; Pavel Hulak, Ceske Budejovice; Pavel Nemec, Bratislava; Josef Katzer, Prague; Karel Stastny, Pribram, all of Czechoslovakia

[73] Assignee: Ceskoslovenska komise pro atomovou energii, Prague, Czechoslovakia

[21] Appl. No.: 636,750

[22] Filed: Dec. 1, 1975

Related U.S. Application Data

[60] Division of Ser. No. 520,377, Nov. 4, 1975, abandoned, which is a continuation-in-part of Ser. No. 322,499, Jan. 10, 1973, abandoned.

[30] Foreign Application Priority Data

Jan. 10, 1973 [CS] Czechoslovakia ..................... 206-72

[51] Int. Cl.$^2$ ..................... B01D 15/06; G21F 9/12
[52] U.S. Cl. ..................... 521/26; 210/24; 423/6
[58] Field of Search ..................... 210/24, 30 R, 28; 260/8, 9, 17.2, 2.2 R, 22 C; 252/301.1 W; 423/2, 6

[56] References Cited

U.S. PATENT DOCUMENTS

| 3,340,200 | 9/1967 | Noble ..................... 252/301.1 W |
| 3,725,291 | 4/1973 | Serbus et al. ..................... 260/8 |
| 3,993,558 | 11/1976 | Prockazka et al. ..................... 210/28 |

*Primary Examiner*—Joseph L. Schofer
*Assistant Examiner*—Peter F. Kulkosky

[57] ABSTRACT

Waste waters, particularly waste waters with radioactive contamination, are cleaned by a sorption-precipitating process, where the sorbent retaining cations are regenerated that is, activated, by a solution, the cationic component of which forms with anionic contaminations a precipitate, taking along cationic contaminations, and simultaneously sticking on the surface and within pores of the sorbent.

2 Claims, No Drawings

METHOD OF PRODUCING AN ACTIVATED CATION-RETAINING SORBENT THROUGH FORMATION OF A MICROCRYSTALLINE PRECIPITATE WHICH ADHERES IN THE PORES AND ON THE SURFACE OF THE SORBENT

RELATED APPLICATION

This is a division of copending application Ser. No. 520,377, filed Nov. 4, 1975, now abandoned, which in turn is a continuation-in-part of application Ser. No. 322,499 filed Jan. 10, 1973, now abandoned.

BACKGROUND OF THE INVENTION

Actually known and applied processes for decontamination of radioactive waste waters and for cleaning of waters in general are usually based on the application of sorption, precipitation or coprecipitation methods. In the first case a number of sorbents are used, operating for instance on principles of ion exchange (synthetic ion exchange material, material of natural, inorganic or organic origin), of adsorption, deposition on ion precipitates and similar in the second case there is a chemical precipitation of macro - impurities, or if trace radioactive material has to be eliminated - a coprecipitation, cocrystallization, creation of amorphous crystals and similar. An advantage of sorption methods is above all the possibility of regeneration or activation of most sorbents, using a relatively simple technology and apparatus with a generally favorable economy of the process. Coprecipitation methods are with respect to sorption processes more effective, mainly so far as decontamination from trace impurities is concerned. The requirement of supply of components of the carrier precipitates up to surpassing the corresponding solubility products and separation of the originating solid phases from the decontaminated water, makes however the precipitating and coprecipitating processes in a number of cases technically and economically less attractive.

SUMMARY OF THE INVENTION

The method according to this invention, called also a "sorption-precipitating method" combines the advantages of both decontamination principles, that is the advantage of the sorption (possibility of regeneration, simple technical process and apparatus, favorable economy) and the advantage of coprecipitation (high decontamination effectiveness). We have found, that by selection of a suitable regeneration process, composition of the regeneration agent and the type of sorbent, a high decontamination or cleaning effectiveness can be achieved while maintaining an operating process, characteristic for granular, solid sorbents. A gradual creation of a microcrystalline precipitate is distinctly proceeding inside the pores and on the surface of the sorbent in the course of the proper decontamination phase of the process, that is for instance in the course of passage of the decontaminated water through a column with a solid bed of a regenerated sorbent. The chemical composition of the generated precipitate is determined by the regeneration method and by the composition of the cleaned water; the regeneration method is selected with respect to the composition of water so that a precipitate with a maximum "taking along" effectiveness for the respective impurities is obtained (mechanism of coprecipitation, adsorption and similar).

The method according to this invention can be best demonstrated on decontamination of waters discharged in the course of treating radioactive raw material, the main contamination of which is mostly Ra 226.

A reliable removal of Ra 226 can be for instance achieved by coprecipitation of $BaSo_4$, $PbCO_3$ and similar. Sorption proceeds for instance on strongly acid cation exchange material also, but with a lower effectiveness and selectivity respectively, which does not always meet hygienic safety requirements. It should be remarked, that the form of existance of $^{226}Ra$ and of radium as a chemical individuality is never exactly determined in natural waters and that radium is present partly as a cation, partly in a colloidal shape. Thus the natural waters differ from those synthetically prepared. These circumstances are simultaneously one of the reasons for a smaller effectiveness of cleaning by means of ion exchange systems in the course of disactivation of these waters.

In the process according to this invention a sorbent of a suitable porosity and shape with functional groups forming chelate groups and exchangeable groups is used. Under the term "cation-retaining sorbent" there is to be understood a sorbent which is capable of sorbing cations by mechanism of e.g. ion exchange or chelate production, provided it contains some suitable functional groups, such as, for example, carboxyl, amine, hydroxyl, and further e.g. amino acids, hexosamines, or the like. Thus the term "cation-retaining sorbent" implies a sorbing substance suitable for clearing wastewaters in the manner disclosed in the present application. Sorbents on the basis of mycelium of fungi of the strain Penicillium chrysogenum, stiffened for instance by a resorcin-formaldehyde, ureo formaldehyde or some other resin, having the capability of sorption of cations for instance of heavy metals, earth alkali metals and others (probably by an exchange mechanism) and also for electrolytes (probably by a diaphragm mechanism) proved to be effective. By their regeneration, for instance with 0.1M solutions $Pb/NO_3/_2$, $Fe/NO_3/_3$, $FeCl_3$, $BaCl_2$ and the like, a sorption of the cationic component takes place, which remains in the biosorbent also after washing with water (the anionic components are removed in the course of the operation), in a concentration about 0.5 to 1 mol/kg of 0.2 to 0.6 mol/liter of the biosorbent. In the course of contamination of the regenerated (and washed) biosorbent by waste water, contaminated by Ra 226 by the dynamic, that is by the column method both the anionic and cationic components diffuse also into the phase of the biosorbent. Due to a relatively high concentration of the cations ($Pb^{+2}$, $Fe^{+3}$, $Ra^{+2}$ and similar in the phase of the biosorbent and due to the mentioned capability of sorption for electrolytes, the result of the contact is a gradual creation of a microcrystalline precipitate, for instance $Fe(OH)_3$, $Pb(NO_3))_2$, $PbSO_4$ and the like inside and on the surface of the biosorbent accompanied by a distinct reduction of the concentration of Ra 226 in the decontaminated water. The anionic components forming the sediment need not be supplied into the decontaminated water; this concerns anions $SO_4^{-2}$, $HCO_3^-$, $CO_3^{-2}$, $HO^-$, which after surpassing the respective solubility products are in a sufficient amount in the decontaminated water (see the relatively high concentration of the cation in the biosorbent, forming the precipitate). This circumstance has also an economical aspect, as the costs for the supply of agents causing coprecipitation cannot be overlooked. Another no doubt significant consideration is the creation and simultaneous sticking of the sediment on the surface and inside the biosorbent, solving thus the problem of separation of "coprecipitates" from the decontaminated water by a method which is technically relatively very convenient. The term cation component relates to the composition of a regenerating solution used for the sorbent recovery. Thus, for instance, in the recovery with the solution of 0.1M $FeCl_3$, this cation component is constituted by $Fe^{+3}$ which will be sorbed to a sorbing substance, viz. e.g. the biosorbent of M-type.

At least one anion for reaction with the cation-retaining sorbent must be present in a sufficient concentration in the water to be purified. The anion thus required to be present depends on the cation-type of the sorbent. During the reaction between the anions and cations the respective microcrystalline precipitate is produced. Among the suitable anions are: sulphates, bicarbonates and hydroxyls.

After "saturating" the biosorbent layer follows the elution connected with dissolution of the precipitate. The selection of the elution agent is determined primarily by the chemical composition of the precipitate. It is for instance possible to use a diluted mineral acid for iron hydroxide and lead carbonate, a solution of sodium hydroxide, sodium thiosulphate or ammonium acetate for lead sulphate, a complex III solution for barium sulphate and the like.

In the course of the proper decontamination operation only a part of the cation capable to form a sediment is converted to a sediment, the rest is bonded by functional groups of the sorbent (the lower degree of conversion is probably due to the reduced accessibility of the "internal" functional groups of the sorbent, which is determined both as consequence of the created precipitate and by the degree of denaturing if above-mentioned sorbents are used), which degree is a consequence of creation of an "external" barrier from the formed precipitate - of course this effect is sufficient for decontaminating amounts of water of the order $10^3$ with one volume of the sorbent. We have found, that when making the pattern of the whole working cycle of the decontamination process as a whole (this cycle is opposed of the operations of sorption or rentention respectively, elution and regeneration), that by selection of an elution agent of suitable concentration and composition, for instance 0.1N HCl for iron hydroxide, it is possible to practically achieve a dissolution of the precipitate only and an accessibility of functional groups, which did not take part in the reaction. The regeneration can be then performed less frequently, for instance each third to fifth cycle.

The application of the method of cleaning waste waters according to this invention, as follows from the above said, is connected with the use of a sorbent of certain properties, determined by the structure and character of the functional groups. This concerns particularly the following properties; the dependence of the selective coefficient of sorption of cations forming the precipitate on the pH value, sorption of electrolytes, sufficient porosity, required mechanical resistivity and the like. From this point of view proteins, polysacharides, hexosamines and other organic biopolymers, possibly also synthetically prepared polymers such as for instance chelate resins are suitable.

EXAMPLE 1

The process consisted in the application of a dynamic cleaning method, that is in a contacting of a liquid phase with a biosorbent in a column (with a solid biosorbent bed) in the course of passage from the top to the bottom. A natural radioactive waste water has been used, having approximately the following composition:

| | | | |
|---|---|---|---|
| $^{226}Ra$ | 200 to 800 pCl/1000 ml | | |
| $Ca^{2+}$ | 10 to 50 mg/1000 ml | | |
| $Mg^{2+}$ | 2 to 10 mg/1000 ml | | |
| $Fe^{3+}$ | 0.2 to 1 mg/1000 ml | | |
| pH | overall hardness, | 6.8 acidity | 0.8 |
| | German degrees 7.6 alkalinity | MO mval/l | 2.3 |
| | temporary hardness | | |
| | German degrees 6.4 $Cl^-$ | mg/l | 5.5 |
| | permanent hardness | | |
| | German degrees 1.2 $SO_4^{--}$ | mg/l | 15.0 |
| $Na^+$ | mg/l 10.0 $NO_3^{31}$ | mg/l | traces |
| $K^+$ | mg/l 5.0 $HSO_3^{31}$ | mg/l | 140.0 |
| $Mn^{++}$ | mg/l 0.05 $NO_2^{31}$ | mg/l | traces |
| $U^{nat}$ | mg/l 0.02 $SiO_2$ | mg/l | traces |
| | $PO_4$ | mg/l | traces |
| | $H_2S$ | mg/l | traces |
| | $Ra^{226}$ | pCl/l | 450 to 500 |

10 ml of a biosorbent of the type M is introduced into a column of a diameter 10 mm and a height of 140 mm. The biosorbent is first eluted by 200 ml 0.1N HCl, washed with 100 ml of distilled water and thereafter regenerated by 200 ml 0.1M $FeCl_3$ and again washed with 100 ml distilled water. In the course of all these operations, the work proceeds at a specific load 5, that is 5 ml/ml of biosorbent, hours. The proper cleaning operation of the said waste water follows thereafter by allowing its passage at a specific load 10 through the column. The concentration of $^{226}Ra$ in the liquid phase behind the column increases gradually. After passage of 10 liters it amounts to about 30 pCl/liter and after passage of 15 liters the output concentration is about at the level of the input concentration.

EXAMPLE 2

With the conditions as described in Example 1, it is possible to use a regenerating agent an aqueous solution of the order $10^{-1}$M $Pb/NO_{3/2}$, $BaCl_2$ and the like and replace with the same cleaning effect the biosorbent type M by a biosorbent of type R.

EXAMPLE 3

With the conditions as described in Examples 1 and 2 it is possible to simplify the cleaning process so that the regenerating solution is applied cyclically after three or more sorption-elution stages. Their number between individual regenerating stages has to be determined in dependence on external cleaning conditions.

EXAMPLE 4

If in case of the process as described in Example 3 the regeneration stages are completely omitted, a reduction of the penetration capacity of the biosorbent is observed in the course of repeating the sorption-elution stages. The penetration capacity at the tenth cycle is for instance achieved at the passage of about three liters. From the above said follows, that for a prolonged application, the biosorbent has to be periodically regenerated.

EXAMPLE 5

It is possible to perform with the arrangement described in example 1 analogically a cleaning of wasste waters from natural uran. The respective operating process is as follows: The column with a biosorbent of the type R or M is first eluted with 200 ml of an alkaline salt brine (having for instance the composition: 10%

NaCl, 0.5% $Na_2CO_3$), after washing with tap water follows regeneration by 200 ml 0.1M $CaCl_2$. All these operations are performed at a specific load 3 to 5. The process of the proper cleaning of waste water follows, which has for instance the following composition:

| $U^{nat}$ | 1 to 4 mg/1000 ml |
|---|---|
| Permanent hardness in German degrees | 1.8 |
| temporary hardness in German degrees | 10.0 |
| material dissilved in mg/l of the evaporation residue | 329 |
| material dissolved in the ashes | 192 |
| nitrates | 24.- |
| sulphates | 127.5 |
| chlorides | 19.5 |
| iron total | 0.2 |
| $Ca^{2+}$ | 84.1 |
| $Mg^{2+}$ | 0.48 |
| $Na^+$ | 33.0 |
| $K^+$ | 8.5 |
| pH | 7.62 |

It is suitable to adjust the pH value of this natural waste water prior to its supply to the column to an acid pH of about 3.5 by adding $H_2SO_4$. The concentration of natural U in the liquid phase behind the column gradually increases and at a passage of about 8 liters the value of 0.1 mg U/1000 ml is achieved. After passage of 14 liters the input and output concentrations are approximately equal.

EXAMPLE 6

It is possible to simplify the cleaning process as described in Example 3 analogically by applying the regeneration solution cyclically after three or more sorption-elution stages.

In the above description, the following terms, which are well-known in the art, have the following difinitions: "Biosorbents" of the type M or R: These are sorption substances prepared in accordance with the co-pending U.S. pat. application, Ser. No. 331,659, as particularly by reinforcing fungi mycelia of the strain PENICILLIUM CHRYSOGENUM by means of urea-formaldehyde resin (type M) or resorcinol-formaldehyde resin (type R), "pCi/liter" (pikocurie per liter) - gives the concentration of radium $^{226}$ in the water to be purified; concretely, 1 pCi $^{226}$Ra = $10^{-12}$g $^{226}$Ra. In accordance with the publication "Standardization of Radioactive Waste Categories" (Technical Reports, Series No. 101, International Atomic Energy Agency, Vienna, 1970) the radioactivity of waste waters is given at present in microcuries per liter: 1 uCi = $10^6$ pCi. Thus the Ra concentration data in Example 1 would read, for instance:

$$(200 - 800) \, 0.10^{-6} \, \text{uCi/liter}$$

"German degrees" indicate the water hardness:
one German degree = 10 mg CaO/liter or
one German degree = 3,357 milliequivalents/liter
one German degree = 1.4 American degree.

"Specific load" is the term indicating the flow rate, which is current in the respective Czech, German etc. professional literature. It gives the value of volume flow rate expressed as a liquid volume per hour relative to one volume part of the sorbent. Thus, for example, specific volume = 5 means five volume parts of water per one volume part of sorbent per hour.

In Anglo-Saxon professional literature, the rate of liquid flow through a column is given, as a rule, in gal./sq. ft./min., less frequently in gal./cu.ft./min. If the column diameter is given, the quantities can be, of course, converted into other ones.

Although the invention is described with reference to a plurality of preferred embodiments thereof, it is to be expressly understood that it is no way limited to the disclosure of such a plurality of preferred embodiments, but is capable of numerous modifications within the scope of the appended claims.

What is claimed is:

1. In a method of activating a cation-retaining sorbent for use in the purification of waste water containing ions of sulfates, carbonates, bicarbonates and hydroxo groups, the improvement which comprises the steps of contacting a biosorbent selected from the group consisting of type M and type R sorption substances with a regeneration solution selected from the group consisting of iron chloride, lead nitrate, barium chloride, iron nitrate, and calcium chloride, whereby upon a subsequent contact of the resulting activated sorbent with the waste water, the cations in the regeneration solution form, with the anions of the waste water, a microcrystalline precipitate that adheres on the surface and in the pores of the biosorbent.

2. A method as defined in claim 1, in which the waste water contains the cation Ra 226.

* * * * *